No. 754,582. PATENTED MAR. 15, 1904.
J. W. MARSHALL.
SUPPORT FOR COOKING UTENSILS.
APPLICATION FILED AUG. 1, 1903.
NO MODEL.
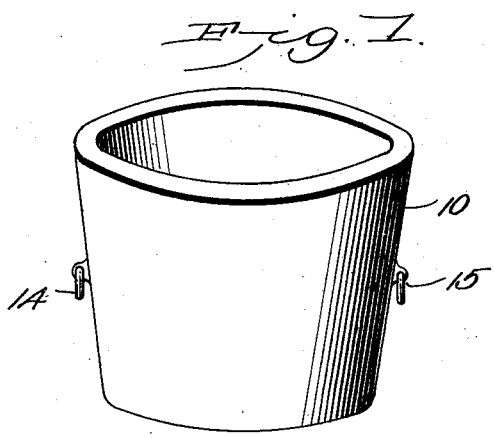
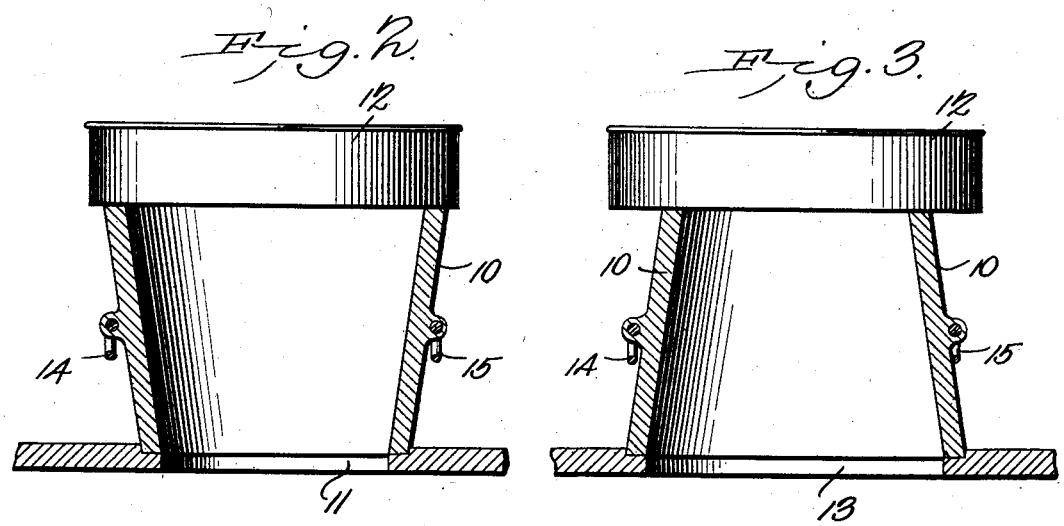
Witnesses
E. F. Stewart
C. K. Woodward
John W. Marshall, Inventor
by C. A. Snow & Co.
Attorneys No. 754,582.

Patented March 15, 1904.

UNITED STATES PATENT OFFICE.

JOHN W. MARSHALL, OF CHLORIDE, TERRITORY OF NEW MEXICO.

SUPPORT FOR COOKING UTENSILS.

SPECIFICATION forming part of Letters Patent No. 754,582, dated March 15, 1904.

Application filed August 1, 1903. Serial No. 167,937. (No model.)

*To all whom it may concern:*

Be it known that I, JOHN W. MARSHALL, a citizen of the United States, residing at Chloride, in the county of Sierra and Territory of New Mexico, have invented a new and useful Support for Cooking Utensils, of which the following is a specification.

This invention relates to devices employed for supporting culinary vessels or receptacles while food or other articles or materials are being cooked therein, and has for its object to provide a device by means of which a mild uniform heat may be imparted to the contents of the vessel and the heat employed with increased economy and also to provide a device which may be employed for stove-lid openings of different sizes without change of structure of the device or the removal of parts from or the addition of parts thereto.

The invention consists in certain novel features of construction, as hereinafter shown and described, and specified in the claims.

In the drawings illustrative of the invention, in which corresponding parts are denoted by like designating characters, Figure 1 is a perspective view of the improved device. Fig. 2 is a sectional elevation with the device applied to one size of stove-opening, and Fig. 3 represents the device applied to a stove-opening of larger size.

The improved device consists of a preferably circular casing or shell having tapered side walls and formed of a material possessing heat retaining and imparting properties, with one end adapted to fit a stove-lid opening and supporting a vessel containing the food to be cooked at the other end.

The device is reversible in position, so that either end may fit over the stove-lid opening to adapt it to openings of different sizes, and will likewise be provided with centrally-disposed movable handles which automatically adjust themselves to operative position no matter in what position the device may be placed.

The device is represented as a whole at 10 with open ends and tapered side walls, one end adapted to fit one size and the other end adapted to fit another size of stove-lid opening.

Generally two sizes of stove-lid openings are employed—No. 8, which is eight inches in diameter, and No. 9, which is nine inches in diameter—and the device will generally be constructed with the ends adapted to fit openings of these sizes to meet the general demand.

The material employed for the device will generally be of cast-iron of sufficient thickness to withstand the strains to which it will be subjected and also to retain the heat for a relatively long period, and thus economize in the use of fuel.

When employed on a No. 8 stove, the smaller end will be set downward, resting on the flange of the lid-opening, (indicated at 11,) and the vessel containing the material to be treated (represented at 12) set on the larger upper end, as shown in Fig. 2.

When employed upon a No. 9 stove, the device will be reversed and the flange of the larger end engaged with the larger opening, as at 13, and with the vessel 12 upon the smaller end, as shown in Fig. 3.

The handles are represented at 14 15 and are disposed centrally of the device, so that they are operative no matter in which position the device may be placed. By this simple arrangement the vessel 12 is supported at considerable distance above the source of heat and is subjected thereby to a comparatively low temperature or a mild heat, which is very essential in cooking some kinds of food. The heat receiving and imparting qualities of the material of which the device is composed also greatly aids in the work and adds materially to the efficiency of the device and economizes in the fuel employed, requiring less fuel to maintain a uniform equal temperature, as there is less loss by external radiation than in conductor means formed of thin sheet metal.

The device can be manufactured cheaply, and thus furnished at small expense, and will be found very convenient for the purpose intended.

The device may be used with various-sized lid-openings, as the tapered walls permit the smaller end to be inserted in the stove-lid opening and held there by the outward flare of the upper portion, the end being projected into the opening until a close fit is obtained. If desired, the larger end may be supported over the hole, with the edge thereof resting on the adjacent surface of the stove-top.

Having thus described the invention, what I claim is—

1. As a new article of manufacture, a support for culinary vessels comprising an imperforate casing of uniform thickness throughout having the side walls thereof tapered toward one end and provided with smooth flat edges.

2. As a new article of manufacture, a support for culinary vessels comprising a casing constructed of heat retaining and imparting material and having tapering sides and reversible in position to fit lid-openings of different sizes by its opposite ends, and provided with swinging handle members centrally disposed upon opposite sides whereby the handle members are in position for use in both positions of the support, substantially as specified.

In testimony that I claim the foregoing as my own I have hereto affixed my signature in the presence of two witnesses.

JOHN W. MARSHALL.

Witnesses:
   HENRY A. SCHMIDT,
   LOUIS KNUSE.